United States Patent [19]
Hamano

[11] Patent Number: 6,045,858
[45] Date of Patent: Apr. 4, 2000

[54] FILM AND PROCESS FOR PRODUCING THE SAME

[75] Inventor: Shokichi Hamano, Saitama, Japan

[73] Assignee: Sumika Plastech Co., Ltd., Tokyo, Japan

[21] Appl. No.: 09/127,727

[22] Filed: Aug. 3, 1998

[30] Foreign Application Priority Data

| Aug. 4, 1997 | [JP] | Japan | ................................. 09-208730 |
| Feb. 13, 1998 | [JP] | Japan | ................................. 10-030802 |
| Mar. 25, 1998 | [JP] | Japan | ................................. 10-076852 |

[51] Int. Cl.$^7$ ................. C08J 9/00; B05D 5/10
[52] U.S. Cl. ................. 427/208.4; 427/290; 427/316; 427/444; 427/208.6
[58] Field of Search ............. 427/208.4, 208.6, 427/290, 316, 322, 444

[56] References Cited

U.S. PATENT DOCUMENTS

| 4,581,087 | 4/1986 | Johnson . |
| 4,698,261 | 10/1987 | Bothe et al. . |
| 4,919,999 | 4/1990 | Soom . |
| 5,496,605 | 3/1996 | Augst et al. . |
| 5,589,246 | 12/1996 | Calhoun et al. . |
| 5,662,758 | 9/1997 | Hamilton et al. . |
| 5,792,411 | 8/1998 | Morris et al. . |

*Primary Examiner*—Deborah Jones
*Assistant Examiner*—Jason Savage
*Attorney, Agent, or Firm*—Pillsbury Madison & Sutro LLP

[57] ABSTRACT

A pressure-sensitive adhesive tape having a layer of thermoplastic resin wherein the substrate is provided with a plurality of perforations through its thickness wherein each perforation is surrounded by a burr which is substantially flattened is provided. One useful example of the film is a pressure-sensitive adhesive tape having a layer of pressure-sensitive adhesive.

There is also provided a process for producing a film comprising the steps of:

Step (A): press protrusions provided on a surface of a roller against a substrate comprising a layer of thermoplastic resin to open a plurality of perforations in the substrate; and Step (B): subjecting the substrate, obtained by Step (A), which has a plurality of perforations to a heat treatment while pressing. The process may have a further step of applying a pressure-sensitive adhesive to at least one surface of the substrate obtained in Step (B).

8 Claims, 2 Drawing Sheets

FILM AND PROCESS FOR PRODUCING THE SAME

BACKGROUND OF THE INVENTION

1. Field of the Invention

The present invention relates to a film which can easily be torn by hand, generating no shavings and producing a roll of film which is reduced in volume. The present invention also relates to a process for producing the same. A film which can easily be torn by hand is a film having good "hand-tearability". The hand-tearability is a property allowing the film to be torn by hand without using any special cutting tools such as scissors or cutters. The representative examples of such a film invented are: a pressure-sensitive adhesive tape, a pressure-sensitive adhesive film, a substrate thereof and a film for wrapping fresh food such as vegetables.

2. Description of the Related Art

A thin material such as a film is often dealt with in a form of a roll in its production, storage and transportation. The size, such as width and thickness, of the roll is set depending upon its usage and the like. "A roll of film having reduced volume" means that thickness of the roll of the film of predetermined length is less than that of conventional films of the same length.

A film which has a lot of fine perforations opening through its thickness and can be used as a substrate of a pressure-sensitive adhesive tape is disclosed in the Japanese unexamined patent publication Hei 8-199123. This film is made of plastics such as polyester and polypropylene and has tapered perforations.

The above Japanese publication discloses a process for producing a film wherein an unprocessed film is pressed between a first roller to whose surface fine diamond particles are attached and a second roller having a hard smooth surface and perforations are opened in the unprocessed film by the fine particles.

However, both the roll of film disclosed in the above publication and the roll of a pressure-sensitive adhesive tape having that film which is used as a substrate are problematic in their volume. It is reasonable to assume that the reason of that problem is as follows:

The perforations are opened by a physical method in which an object having a sharp tip such as a diamond particle is pressed onto the unprocessed film against its first (front) surface toward its second (back) surface opposite to the front surface between the rollers. Burrs which occurred at the formation of the perforations protrude on the back surface of the film. As a result, the roll of the film with its protruding burrs increases in volume due to the presence of the burrs.

When a film having protruding burrs is used as the substrate for a pressure-sensitive adhesive tape and a pressure-sensitive adhesive is applied to its front surface on which the burrs are not present, a roll of the pressure-sensitive adhesive tape obtained becomes thick due to its still remaining protruding burrs and, thus a volume problem occurs. On the other hand, when the pressure-sensitive adhesive is applied to the back surface, on which the burrs are, the entire burrs must then be covered with a pressure-sensitive adhesive in order to achieve satisfactory pressure-sensitive adhesion, and as a result, the pressure-sensitive adhesive tape becomes thick and thus also a volume problem occurs.

Moreover, in the employment of the film having the protruding burrs as a wrapping material for wrapping fresh food, when the film is used with its back surface on which the burrs protrude as the inner surface of the wrapping material, shavings of the burrs occur by its rubbing against itself and that with the food. Additionally, some effort to recognize the front and back side of the film is required before using the film.

SUMMARY OF THE INVENTION

I have intensively studied to develop a film which can easily be torn by hand, generating no shavings and producing a roll of film which is reduced in volume. As a result, I have found that a burr 3 of a thermoplastic resin film, the burr protruding around a perforation as shown in FIG. 2, can be substantially flattened, as shown in FIG. 3, by subjecting the film to a heat treatment while pressing, wherein the perforation was opened by piercing the film with a needle through tis thickness of the film and wherein the burr was formed at the formation of the perforation. I have made further modification to accomplish the present invention.

According to one aspect of the present invention, there is provided a film comprising a substrate having a layer of thermoplastic resin wherein the substrate is provided with a plurality of perforations through its thickness wherein each perforation is surrounded by a burr which is substantially flattened. This film, in other words, is a film comprising a substrate having a layer of thermoplastic resin, a front surface and a back surface opposite to the front surface wherein the substrate is provided with a plurality of perforations penetrating therethrough from the front surface to the back surface wherein each perforation is surrounded by a burr which is substantially flattened.

In the film of the invention, at least a part of each perforation provided in the substrate can be substantially closed by a flattened burr. The film of the invention may comprise a plurality of substrates. The film of the invention may comprise a layer without any perforations.

One useful example of the film of the invention is a film further comprising a layer of pressure-sensitive adhesive. This film is useful as a pressure-sensitive adhesive film and a pressure-sensitive adhesive tape.

I believe that the reason why the film of the invention can easily be torn by hand is that a plurality of perforations are provided in the substrate and the reason why the roll of the film has a reduced volume and little shavings occur from the film is that the burrs which formed during the formation of the perforations have been substantially flattened.

According to another aspect of the present invention, there is provided a process for producing a film comprising the steps of:

Step (A): pressing protrusions provided on a surface of a roller against a substrate comprising a layer of thermoplastic resin to open a plurality of perforations in the substrate; and Step (B): subjecting the substrate, obtained by Step (A), which has a plurality of perforations to a heat treatment while pressing.

One example of the process of the invention may comprise a further step of putting a plurality of substrates obtained by Step (B) in layers.

Another example of the process of the invention may comprise a further step of applying pressure-sensitive adhesive to at least one surface of the substrate which was subjected to the heat treatment in Step (B).

DESCRIPTION OF PREFERRED EMBODIMENTS

A film of the invention comprises a substrate comprising a layer of thermoplastic resin. The thermoplastic resin is not particularly limited and may be ones which can be formed in a film by a conventional molding method such as a melt extrusion molding method and an inflation method. Representative examples of the thermoplastic resin include polyolofin resins; polyester resins such as polyethylene terephthalate resin and polyethylene naphthalate resin; polyvinyl chloride resins such as hard vinyl chloride resin; methacrylate resin such as polymethyl methacrylate. Preferred examples of the thermoplastic resin are polyolefin resins and polyester resins. Representative examples of the polyolefin resins include polyethylene resin, polypropylene resin, copolymer resin of ethylene and propylene, copolymer resins of ethylene and/or propylene and at least one α-olefin other than propylene. Preferred examples of the polyolefin resins are polyethylene resin and polypropylene resin. Examples of α-olefin include butene-1, pentene-1, hexene-1, heptene-1, octene-1, nonene-1, 4-methylpentene-1 and decene-1.

Figure 3:
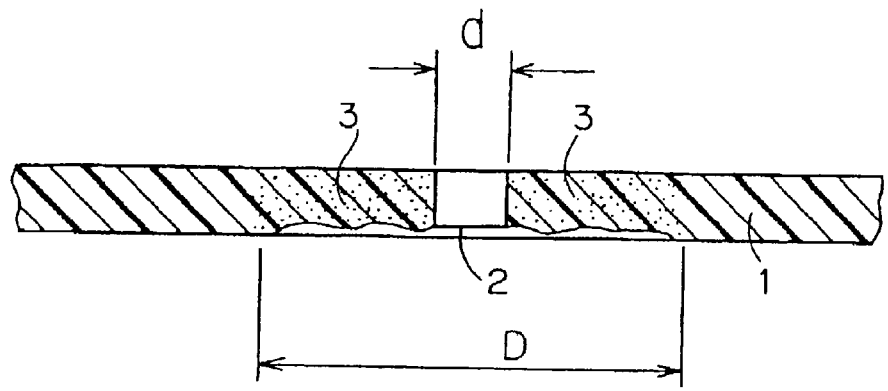
FIG. 3 schematically illustrates a cross-section of a substrate having a perforation.

The shape (the projective shape) of the opening of each perforation provided in the substrate and arrangement of the perforations are not particularly limited as long as the substrate has a satisfactory hand-tearability. The shapes of the perforations may vary such as being circular, oval, semi-circular, square and asymmetrical in shape. The perforations may be arranged either at random or in order such as on a straight line and in lattice. In order to make the film one which can be cut straight by hand, the film with its perforations arrayed on a straight line is preferred. The size of the perforations and the density of the perforations (that is, the number of perforations per unit area ($1 cm^2$) of the surface of the substrate) may be set depending upon the usage of the film. The size of the perforation is indicated by a diameter of the opening thereof, when the opening of the perforation is circular. If it is not circular, the size of the perforation is indicated by a diameter of a circle which has an area equal to that of the opening of the perforation. When the film of the invention is a pressure-sensitive adhesive tape, the size and the density of the perforations may fall in any range that can give satisfactory hand-tearability to the substrate. The perforation diameter D, which is indicated in FIG. 3 which schematically illustrates a cross section of the film of the invention, falls normally within the range of about 2 μm to about 4 mm, preferably within the range of about 20 μm to about 800 μm, and typically within the range of about 20 μm to about 400 μm. Although the density of the perforations has a relationship with the size thereof, it falls normally within the range of about 4 to about 400, preferably within the range of about 9 to about 72, per unit area ($1 cm^2$) of the surface of the substrate.

The degree of hand-tearability of the film of the invention depends on the degree of how easy it is to tear the substrate at its edge which depends on the degree of resistance of the edge against tearing. Therefore, it is preferable to make the perforation density gradually change so that the closer to the edge of the substrate, the higher the perforation density, and thus achieving good hand-tearability.

Thickness of the substrate may be suitably set depending upon the usage of the film and the like, and is not particularly limited, but when the film is the pressure-sensitive adhesive tape, it falls normally within the range of about 7 μm to about 200 μm, preferably within the range of about 12 μm to about 80 μm. For example, when the pressure-sensitive adhesive tape is one for fabricating a corrugated cardboard box, thickness of the substrate preferably falls in the range of about 38 μm to about 60 μm.

A process for producing the film of the invention is not particularly limited, but the process having the following steps can be exemplified as one preferred process.

Step (A): pressing protrusions provided on a surface of a roller against a substrate comprising a layer of thermoplastic resin to open a plurality of perforations in the substrate; and Step (B): subjecting the substrate, obtained by Step (A), which has a plurality of perforations to a heat treatment while pressing.

One example of the process of the invention may comprise a further step of putting a plurality of substrates obtained by Step (B) in layers.

Another example of the process of the invention may comprise a further step of applying pressure-sensitive adhesive to at least one surface of the substrate which was subjected to the heat treatment in Step (B).

The substrate having the layer of thermoplastic resin used in Step (A) may be, for example, a film made of thermoplastic resin. The type and forming method of the film are not particularly limited. For example, the film may be one produced by melt extrusion molding or inflation molding of the forgoing thermoplastic resins. Although the film of thermoplastic resin may be both a non-stretched film and a stretched film, it is preferably the stretched film in order to produce a film having good properties such as tensile strength. Another example of a substrate may comprise a layer of thermoplastic resin and a layer of another material such as resin other than thermoplastic resin, paper, cloth and metal. A substrate which comprises a layer of thermoplastic resin and non-woven fabric can be exemplified.

A plurality of perforations in the substrate having the layer of thermoplastic resin can be opened by pressing the protrusions provided on the surface of the roller against the substrate. To be more concrete, a method in which the substrate is pressed between a needle roller and a smooth roller can by exemplified. Here, the needle roller is a roller which has a lot of protrusions on its surface. The smooth roller is a roller which is smoothly covered its surface with a soft material such as silicon rubber and urethane resin. As the needle roller, there can be exemplified a roller wherein a plurality of thin needles of hard metal having a sharp tip are provided on its surface.

Figure 4:
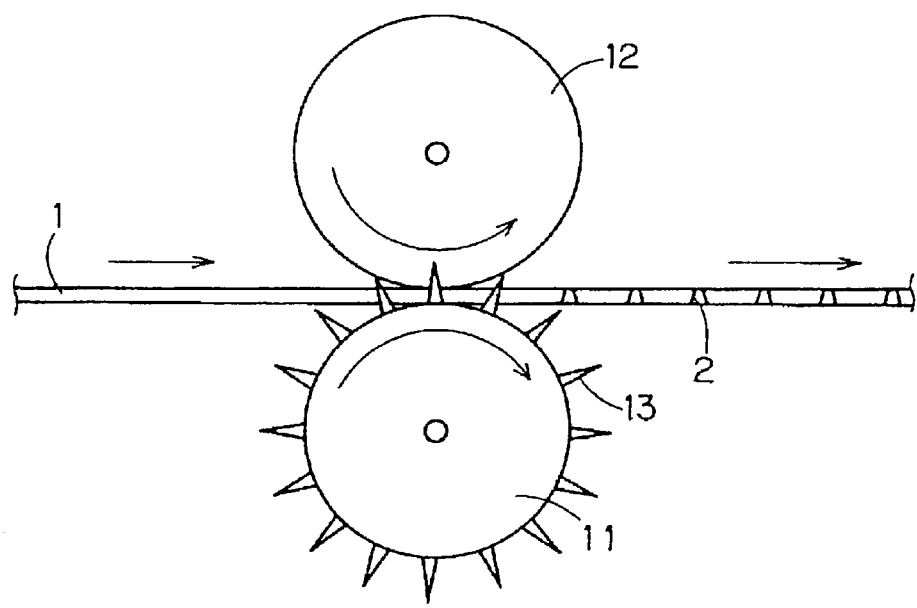
FIG. 4 illustrates a scene in which a substrate having a plurality of perforations is continuously produced.

FIG. 4 is a cross section which schematically illustrates a scene in which the substrate 1 having a layer of thermoplastic resin is pressed between the needle roller 11 and the smooth roller 12 to continuously produce the substrate having a plurality of perforations. The substrate having the plural perforations is continuously produced by passing the substrate 1 having a layer of thermoplastic resin, which is continuously supplied from the left side of FIG. 4, through the nip between the needle roller 11 and the smooth roller 12 to press the substrate along its thickness so that the needle 13 of the needle roller 11 pierces the substrate until the needle pierces the soft material of the smooth roller 12.

Figure 2:
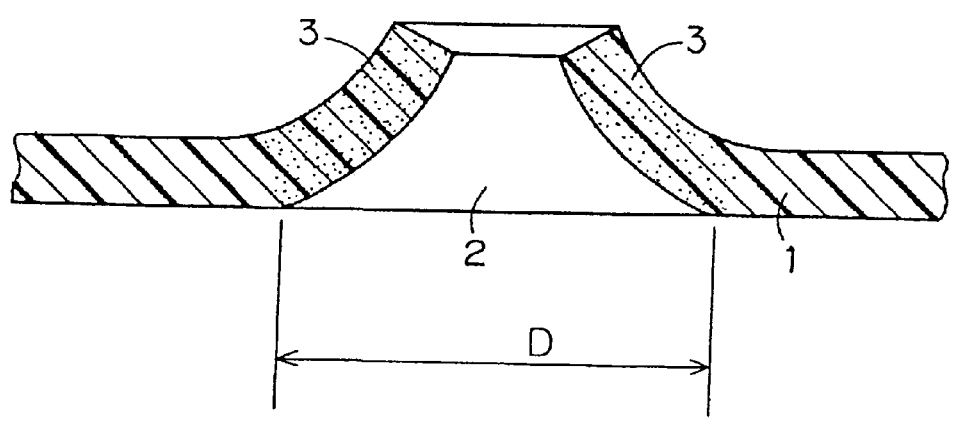
FIG. 2 schematically illustrates a cross-section of a substrate which is obtained by a method illustrated in FIG. 4.

FIG. 2 is an enlarged cross section of the substrate 1 having a plurality of perforations 2 obtained by the method shown in FIG. 4. FIG. 2 illustrates the substrate 1 with focusing on one perforation 2. The substrate has the front surface (the lower surface shown in FIG. 2) from which the protrusion on the roller entered the substrate and the back surface (the upper surface shown in FIG. 2) through which the protrusion went out of the substrate. Around the perforation 2 in the back surface of the substrate, the burr 3 exists with protruding on the back surface.

The heat treatment of the substrate while pressing in Step (B) may be conducted, for example, by pressing the substrate along its thickness between a metal roller having a heated smooth surface and a rubber roller having a smooth surface. By performing this step, the burr 3 protruding on the back surface of the substrate is substantially flattened as illustrated in FIG. 3.

FIG. 3 is a schematic cross section of the substrate in which the burr 3 has been substantially flattened. The burr 3 protruding on the back surface of the substrate is substantially flattened by the heat treatment while pressing so that the burr becomes substantially flush with the part of the back surface which is apart from the perforation wherein there is a distance of at least about D/2 between the center of the perforation and that part of the back surface. Here, D is the diameter of the opening of the perforation as shown in FIG. 3. Namely, although the substrate shown in FIG. 3 has a perforation 2, it substantially does not have any burrs protruding on the back surface. Since the burr 3 which has been substantially flattened covers the perforation 2, the diameter of the perforation on the back surface of the substrate after the heat treatment (the upper diameter "d" in FIG. 3) is smaller than that before the heat treatment. Although the diameter of the perforation on the back surface of the substrate after the heat treatment normally ranges from about 1/10 to about 1/4 of the diameter "D" in the front surface, the diameter "d" can be made substantially zero by making a suitable choice of the substrate material. When the diameter "d" is substantially zero, or the perforation is substantially closed at any given point of the substrate, the perforation thus substantially becomes a non-perforation.

The substrate in which the burr 3 has been substantially flattened and at least a part of the perforation is substantially closed is preferred as a substrate of the pressure-sensitive adhesive tape, because even when a pressure-sensitive adhesive of low viscosity is applied to it, strike-through of the pressure-sensitive adhesive never occurs and the pressure-sensitive adhesive can be efficiently applied. Additionally, such a substrate is preferable, because when the pressure-sensitive adhesive tape is printed letters and/or pictures on its pressure-sensitive adhesive-free surface with an ink, it does not suffer from an ink strike-through and thus, can be clearly printed. Here, the "strike-through" is a phenomenon that a material applied to the substrate permeates from the surface of the substrate to which the material is applied to the opposite surface through perforations.

Temperature of the heat treatment in Step (B) is a temperature such that the burr can be flattened without deteriorating mechanical properties such as tensile strength and other properties such as the smoothness of the substrate, and it may be suitably set depending upon thermal properties such as a softening point of the thermoplastic resin contained in the substrate. The temperature of the heat treatment normally ranges from about 120° C. to about 240° C. for polypropylene resin and from about 80° C. to about 180° C. for polyethylene resin.

Although the simplest substrate is one composed of a single layer of thermoplastic resin, the substrate in the invention is not limited to this. The substrate may have a multi-layered structure in which plural layers of thermoplastic resin are laminated. Alternatively, the substrate may have another multi-layered structure which is composed of a layer of thermoplastic resin and a layer of material other than thermoplastic resin. Examples of the material which makes up each layer of the multi-layered structure include resin, paper, cloth and metal. Each layer included in the multi-layered structure may contain various additives such as fillers, colorants and stabilizers.

Although the film of the invention can have a layer other than the substrate, it is not necessary that the layer other than the substrate has perforations, unless the hand-tearability of the film is deteriorated. For example, although a layer which has satisfactory hand-tearability only when it has the perforations such as a layer of resin which has unsatisfactory hand-tearability is required to has the perforations, a layer which has satisfactory hand-tearability even when it does not have any perforations such as a layer of resin, paper, cloth or metal which has satisfactory hand-tearability is not always required to have the perforations. If the material of each layer and the adhesive for adhering layers to each other are suitably selected, and when the film will be cut, delamination is unlikely to occur.

When a stretched thermoplastic resin film such as a stretched polyolefin resin film is used as a substrate, the film is sometimes shrunk by the heat treatment in Step (B). In order to avoid shrinkage of the stretched thermoplastic resin film, it is possible to use, as the substrate, a two-layered film which is composed of a stretched thermoplastic resin film (the first film) and a stretched film (the second film) made of another thermoplastic resin whose burr can be flattened at a lower temperature than the first film. When such a two-layered film is used, it is preferred that the two-layered film with its perforations is applied so that the burrs face the heated metal roller when the film pressed and heated.

Preferred examples of the substrate having a multi-layered structure include (a) a substrate which is obtained by a method in which two stretched polyolefin films, such as stretched polypropylene resin films, are adhered with each other to produce a two-layered film, and then the two-layered film is opened perforations by a needle roller, and finally it is subjected to the heat treatment while pressing; (b) a substrate which is obtained by a method in which two stretched polyolefin resin films, such as stretched polypropylene resin films, are applied the pressure-sensitive adhesive to one surface of each substrate, and then each substrate is opened perforations, and finally they are processed and heated while their surfaces to which the pressure-sensitive adhesive is applied facing each other; and (c) a substrate which is obtained by a method in which a stretched polyolefin resin film, such as a stretched polypropylene film, and non-woven fabric are adhered with adhesive to produce a two-layered film followed by opening the perforations, and finally the two-layered film is subjected to the heat treatment while pressing.

The multi-layered substrates of the foregoing (a)–(c) can be substrates which have good hand-tearability, generating no shavings of burrs and producing rolls which are reduced in volume. Additionally, when the materials of each layer and the adhesive which adheres each layer are suitably selected, the substrate may become one in which at least a part of each perforation is substantially closed and in which delamination is difficult to occur. The reason why at least a part of each perforation is substantially closed and delamination is difficult to generate is not clear, but the assumption is that the heat treatment mainly effects the reduction of the opening size of the perforations and controls generating delamination.

One example of the film of the invention is the pressure-sensitive adhesive tape or film composed of the substrate and the layer of the pressure-sensitive adhesive.

The pressure-sensitive adhesive applied to the substrate may be known ones. Examples of the pressure-sensitive adhesive which can be used include acryl-base, vinylether-base, silicon-base and rubber-base pressure-sensitive adhesives. The form of the pressure-sensitive adhesive may be solution-form, emulsion-form and hot melt sheet-form pressure-sensitive adhesive. When the perforation diameter "d" in the back surface of the substrate is not satisfactorily small, the strike-through of the pressure-sensitive adhesive easily occurs, whichever surface of the substrate it is applied to. Therefore, in order to avoid the strike-through of the pressure-sensitive adhesive, a pressure-sensitive adhesive of high viscosity ranging from about 8,000 cps to about 70,000 cps, preferably from about 20,000 cps to about 50,000 cps at 20° C. may be employed. If "d" is relatively small, the strike-through will not occur even if a pressure-sensitive adhesive of low viscosity ranging from about 2,000 cps to about 8,000 cps is used. Thickness of the layer of the pressure-sensitive adhesive can be suitably set depending upon size of the pressure-sensitive adhesive tape (width and thickness of the substrate) and the usage of the tape, and it is normally from about 10 $\mu$m to about 50 $\mu$m.

A method for applying the pressure-sensitive adhesive to the substrate is not particularly limited. Methods known in the art of pressure-sensitive adhesive tape, such as a roll coater method, can be used. In order to improve an affinity of the pressure-sensitive adhesive with the surface of the substrate, namely an anchoring property of the pressure-sensitive adhesive to the substrate, the surface of the substrate to which the pressure-sensitive adhesive is applied may be subjected to a pretreatment. As the pretreatment, methods known in the art of pressure-sensitive adhesive tape, such as a corona discharge treatment and priming, can be employed.

The pressure-sensitive adhesive tape may be both one in which the pressure-sensitive adhesive is applied to only one surface of the substrate and a double sided pressure-sensitive adhesive tape in which the pressure-sensitive adhesive is applied to both surfaces of the substrate. The film of the invention may be a removable pressure-sensitive adhesive tape. In this case, the pressure-sensitive adhesive may be selected among pressure-sensitive adhesives known in the art of removable pressure-sensitive adhesive tape.

According to the present invention, a film which has good hand-tearability, generating less shavings of burrs and producing the roll thereof which is reduced in volume.

The film of the invention is useful as the pressure-sensitive adhesive tape or film or the substrate thereof. The substrate having perforations can be employed as a substrate of a sticking plaster, wrapping material for food such as vegetables and fermented soybeans, a packing material for a deoxidizing agent and a chemical pocket body warmer, a covering material of wallpaper and a separator in a battery.

EXAMPLES

The following examples further illustrate the present invention in detail, but are not to be construed to limit the scope of the invention.

Example 1

Preparation of Substrate

A stretched polypropylene resin film having a thickness of 25 $\mu$m (a commercial name: YT-22; manufactured by Toray Industries, Inc.; a laminated film of a biaxially-stretched polypropylene resin film and a transversally uniaxially-stretched polypropylene resin film) is treated according to the method as illustrated in FIG. 4 to produce a film having a lot of perforations and burrs. Each perforation had an opening diameter "D", which is indicated in FIG. 2, of 0.3 mm. The shape of each perforation was approximately circular. The perforations were opened on straight lines at equal intervals in the film's transverse direction which corresponded to the transverse direction of a pressure-sensitive adhesive tape. The perforations were arranged in lattice. The interval between two adjacent perforations was 2 mm. Six films each having the perforations and the burrs were continuously pressed between a rubber roller having a smooth surface and a metal roller having a heated smooth surface to produce six substrates in which the burrs were substantially flattened. The surface of the metal roller was heated to 80° C. for two films, 120° C. for another two films and 140° C. for the remaining two films.

Figure 1:
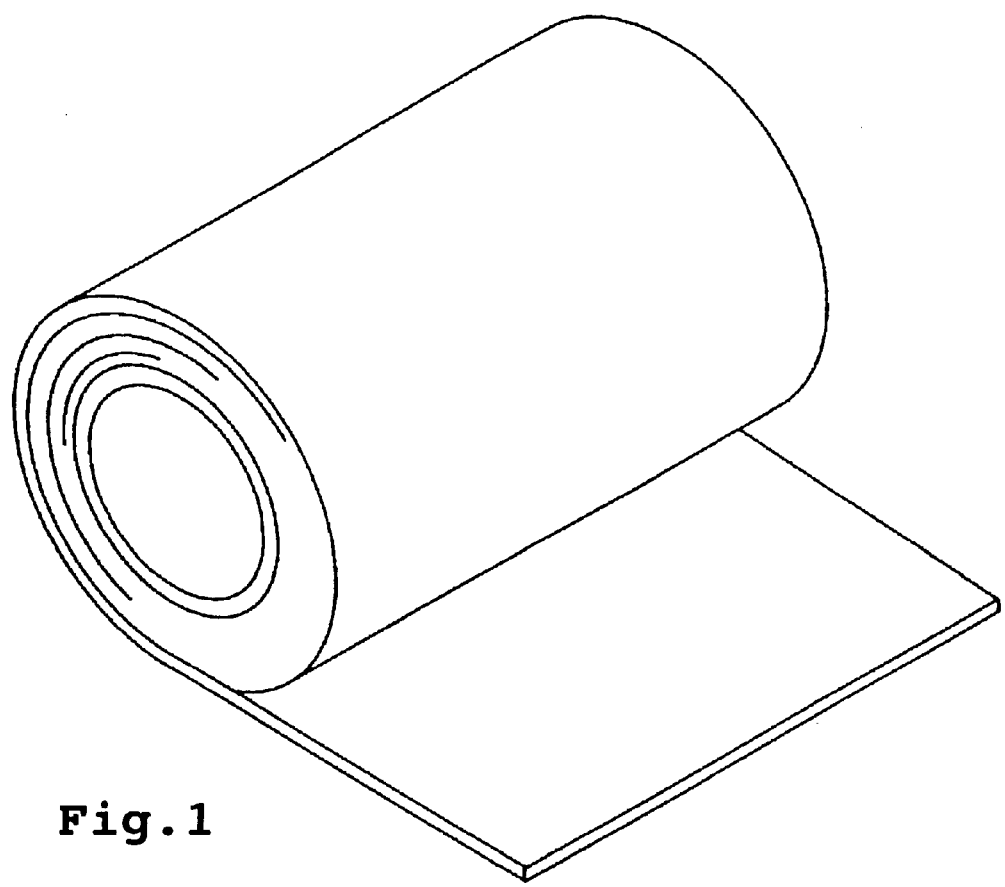
FIG. 1 illustrates a state in which a part of a film is drawn out of a roll.

Each substrate was good in hand-tearability and could be cut straight. Rolls of each substrate illustrated in FIG. 1 had less volume than the roll of the substrate obtained in the following Comparative Example 1. Each substrate did not generate any burr shavings even when rubbing their front surfaces, their back surfaces and their front and back surfaces together.

Preparation of Pressure-Sensitive Adhesive Tapes

Pressure-sensitive adhesive tapes were prepared by applying pressure-sensitive adhesive to the above-obtained substrates by a roll coater method. The roll coater method is one in which the pressure-sensitive adhesive is applied to the substrate while passing the substrate between two rollers and which is well known in he art of pressure-sensitive adhesive tape.

Pressure-sensitive adhesive tapes were produced by applying the pressure-sensitive adhesive to one surface of each substrate by the roll coater method in an amount of 50 g/m$^2$ reducing to the amount of solid. As the pressure-sensitive adhesive, a rubber-base pressure-sensitive adhesive (a solid content: 30%) having a viscosity of 16,000 cps at 20° C. containing natural rubber and rosin as main components and toluene as a solvent, and an acryl-base pressure-sensitive adhesive (a solid content: 45%) having a viscosity of 4,000 cps at 20° C. which contained toluene as a solvent and which was commercially available as the name of #1717 from Soken Chemical & Engineering Co., Ltd. were employed, respectively.

Estimation of Strike-Through of Pressure-Sensitive Adhesive

In order to examine whether the pressure-sensitive adhesive applied reaches the back surface of the substrate through the perforations or not, in other words, in order to investigate whether the pressure-sensitive adhesive strikes through the substrate or not, the substrate was passed through the rollers with its back surface facing a polyethylene terephthalate resin film (a PET film) having a thickness of 25 $\mu$m (a commercial name: E2025; manufactured by TOYOBO CO., LTD), at the application of the pressure-sensitive adhesive.

Immediately after the application of the pressure-sensitive adhesive, the laminate of the PET film and the substrate to which the pressure-sensitive adhesive was applied was placed in an oven of 70° C. After three minutes, it was taken out of the oven and the PET film was gradually peeled off from the substrate. When webbing of the pressure-sensitive adhesive occurred at the peeling, or when a peeling sound occurred, or when the pressure-sensitive adhesive was attached to the PET film peeled, it was judged that there was a strike-through of the pressure-sensitive adhesive. If not, it was judged that there was no strike-through of the pressure-sensitive adhesive.

The pressure-sensitive adhesive tape obtained had good hand-tearability and could be cut straight in its transverse direction by hand. The volume of the roll of the pressure-sensitive adhesive tape was smaller than that of the pressure-sensitive adhesive tape obtained in Comparative Example 1 described below. The estimated result of the strike-through of the pressure-sensitive adhesive is given in Table 1.

Comparative Example 1

Preparation of Substrate

A substrate was prepared according to the same manner as that described in Example 1 except that the film having burrs was not pressed between the heated metal roller and the rubber roller, in other words, Step (B) was not conducted.

The substrate obtained had good hand-tearability, but the volume of the roll thereof was larger than that obtained in Example 1. Moreover, when the back surface of this substrate was rubbed together, shavings of the burrs were generated.

Preparation of Pressure-Sensitive Adhesive Tape

A pressure-sensitive adhesive tape was prepared according to the same manner as that described in Example 1 except for using the substrate obtained above.

The pressure-sensitive adhesive tape obtained had good hand-tearability, but it was approximately twice as thick as one obtained in Example 1. The volume of the roll thereof was larger than that obtained in Example 1. Moreover, when the back surface of this substrate was rubbed together, shavings of the burrs were generated. The estimated result of the strike-through of the pressure-sensitive adhesive is given in Table 1 and it was inferior to that of the pressure-sensitive adhesive tape obtained in Example 1.

TABLE 1

Estimated Results of strike-through of pressure-sensitive adhesive

| | Example 1 | | | Comp. Example 1 |
|---|---|---|---|---|
| Pressure-sensitive | Temperature of heat treatment while pressing | | | |
| adhesive | 80° C. | 120° C. | 140° C. | — |
| Rubber-base | A*1 | A | A | C*3 |
| Acryl-base | B*2 | A | A | D*4 |

*1 "A" indicates that there was no strike-through of the pressure-sensitive adhesive.
*2 "B" indicates that there was almost no strike-through of the pressure-sensitive adhesive.
*3 "C" indicates that there was a little strike-through of the pressure-sensitive adhesive.
*4 "D" indicates that there was much strike-through of the pressure-sensitive adhesive.

Example 2

Preparation of a Substrate

To one surface of a biaxially stretched polypropylene resin film having a thickness of 25 μm (a commercial name: PA-20; manufactured by Sun Tox Corp.), a solvent-type urethane-base adhesive (a commercial name: #3540; manufactured by Notape Industry) was applied by a gravure roll coater method so that the adhesive layer would be 5 μm thick after drying. A substrate having a two-layered structure was prepared by dry-laminating the resultant dry film and the stretched polypropylene resin film manufactured by Toray Industries, Inc., which was the same as that used in Example 1, to adhere them.

A substrate having many perforations and protruding burrs was obtained by treating the substrate obtained above according to the same manner as that described in Example 1 as illustrated in FIG. 4 with the film manufactured by Sun Tox Corp. facing the needle roller. A substrate in which the burrs were substantially flattened was prepared by continuously pressing the substrate having the protruding burrs between a metal roller having a smooth surface heated to 140° C. and a rubber roller having a smooth surface with the film manufactured by Toray Industries, Inc. facing the metal roller.

The substrate obtained had good hand-tearability and could be cut straight by hand. The roll of the substrate had reduced volume. Additionally, no shavings of burrs were generated by rubbing its front surfaces, its back surfaces, and its front and back surfaces together. Delamination also did not occur. Afterwards toluene was applied to the front surface of the substrate, it was pressed with a roller. However, toluene did not soak through the substrate to the back surface. As a result, the perforations of the substrate were recognized to be substantial non-perforations.

Preparation of Pressure-Sensitive Adhesive Tape

A pressure-sensitive adhesive tape, which was prepared by applying the pressure-sensitive adhesive to one surface of the substrate obtained above according to the same manner as that described in Example 1, had good hand-tearability and could be cut straight in its transverse direction by hand. The roll thereof had reduced volume. Delamination did not occur.

Example 3

Preparation of Substrate

A stretched polypropylene resin film manufactured by Toray Industries, Inc., which was the same as that used in Example 1, and a stretched polypropylene resin film manufactured by Sun Tox Corp., which was the same as that used in Example 2, were respectively applied an adhesive made of EVA resin (a commercial name: AD-901; manufactured by Showa Highpolymer Co., Ltd.; an emulsion type adhesive made of a random copolymer of ethylene and vinyl acetate) to one surface of each film by a gravure roll coater method so that the adhesive layer would become 4 μm thick after drying. And then, they were dried.

Two films which had many perforations and protruding burrs were obtained by treating both dry films obtained above according to the same manner as that described in Example 1 as illustrated in FIG. 4 with their adhesive-free surfaces facing the needle roller.

These films having protruding burrs were continuously pressed between the metal roller having the smooth surface heated to 140° C. and the rubber roller having the smooth surface with their surfaces to which the adhesive was applied facing with each other and with the film manufactured by Sun Tox Corp. facing the metal roller to adhere them to produce a substrate in which the burrs were substantially flattened.

Although the substrate generated a little delamination, it had good hand-tearability and could be cut straight by hand. The roll thereof had reduced volume. Even when its surfaces were rubbed together, shavings of burrs did not generate. Additionally, the substrate was applied water to its one surface and then pressed with a roller. As a result, water did not soak through the substrate to its another surface. On the other hand, toluene was applied to a surface of the substrate to its one surface and then pressed with the roller. As a result, toluene soaked a little through the substrate to another surface. However, toluene could not reach the rear surface of the substrate without pressing. From these results, it was recognized that at least a part of each perforation of this substrate was substantially closed.

Preparation of Pressure-Sensitive Adhesive Tape

A pressure-sensitive adhesive tape, which was prepared by applying the pressure-sensitive adhesive to one surface of the substrate obtained above according to the same manner as that described in Example 1, generated a little delamination, but it had good hand-tearability and could be cut straight in its transverse direction by hand. The roll thereof had reduced volume. Additionally, a solution type low viscosity pressure-sensitive adhesive having a viscosity of 2,400 cps (20° C.) was applied to the substrate. The strike-through of the pressure-sensitive adhesive, however, was not observed even ten minutes after the application of the pressure-sensitive adhesive.

Example 4

Preparation of Substrate

A stretched polypropylene resin film manufactured by Sun Tox Corp., which was the same as that used in Example 2, was applied a solvent-type urethane-base adhesive (a commercial name: #3450; manufactured by Notape Industry) to its one surface by a gravure roll coater method so that the adhesive layer would become 3 $\mu$m thick after drying. And then, it was dried. The resultant dry film was dry laminated with a wet non-woven fabric having a weight of 8 g/m$^2$ (a commercial name: Mikilon 008; manufactured by MIKI TOKUSHU PAPER MFG. CO., LTD.) to produce a substrate of a two-layered structure.

A substrate having many perforations and protruding burrs was obtained by treating the substrate obtained above according to the same manner as that described in Example 1 as illustrated in FIG. 4 with the resin film facing the needle roller. A substrate in which the burrs were substantially flattened and which had a thickness of 85 $\mu$m was prepared by continuously pressing the substrate having the protruding burrs between the metal roller having the smooth surface heated to 140° C. and the rubber roller having the smooth surface.

The resultant substrate had good hand-tearability and could be cut straight by hand. The roll of the substrate had reduced volume. Additionally, no shavings of burrs were generated by rubbing its surfaces.

Preparation of Pressure-Sensitive Adhesive Tape

On the surface of the non-woven fabric of the substrate obtained above, an aqueous solution-type acryl-base pressure-sensitive adhesive (a commercial name; #3004; manufactured by Showa Highpolymer Co., Ltd.) was applied so that the pressure-sensitive adhesive layer would become 30 $\mu$m thick after drying, and then dry it. The strike-through of the pressure-sensitive adhesive was not observed. The pressure-sensitive adhesive tape obtained had good hand-tearability and could be cut straight by hand. The roll thereof had reduced volume.

What is claimed is:

1. A process for producing a film comprising:
   (a) preparing a perforate layer of a thermoplastic resin by pressing a roller having a plurality of protrusions against a roller having a substrate thereon, said substrate having a front surface and a back surface, said substrate comprising a layer of thermoplastic resin to obtain a substrate having a plurality of perforations and burrs on said back surface; and
   (b) subjecting the substrate having a plurality of perforations to a heat treatment while conducting said pressing whereby burrs that may have formed on the substrate become flush with the back surface which is apart from the perforation, and whereby after the heat treatment the diameter of the perforation on the back surface of the substrate is substantially zero or in a range of from about 1/10 to about 1/4 of the diameter in the front surface.

2. A process according to claim 1 wherein the perforations are opened on a straight line in step (a).

3. A process according to claim 1 wherein the thermoplastic resin is polyolefin resin or polyester resin.

4. A process according to claim 1 wherein the substrate comprises a film of stretched polyolefin resin.

5. A process according to claim 1 wherein the substrate comprises a film of stretched polyolefin resin and non-woven fabric.

6. A process according to claim 1 wherein the heat treatment while pressing is performed by pressing the substrate with a heated roller.

7. A process according to claim 1 comprising a further step of putting a plurality of substrates obtained in (b) in layers.

8. A process according to claim 1 comprising a further step of applying pressure-sensitive adhesive on at least one surface of the substrate heated in (b).

* * * * *